April 5, 1960     A. E. FENTIMAN     2,931,467
STRUCTURAL FRAMEWORK

Filed Aug. 18, 1954     2 Sheets-Sheet 1

Inventor
ARTHUR E. FENTIMAN
by W. Irwin Haskett
Attorney

Inventor
ARTHUR E. FENTIMAN
Attorney

United States Patent Office 2,931,467
Patented Apr. 5, 1960

2,931,467

STRUCTURAL FRAMEWORK

Arthur E. Fentiman, Ottawa, Ontario, Canada, assignor, by mesne assignments, to Clarence Frank Fentiman, Arthur Edward Fentiman, and Harold Gordon Fentiman, trading as Triodetic Structures, Ottawa, Ontario, Canada Application August 18, 1954, Serial No. 450,717

5 Claims. (Cl. 189—34)

This invention relates to improvements in structural framework and appertains particularly to a novel rod and socket coupling useable in the fabrication or construction of scaffolds, trusses, bridges, walls, roofs, towers and like structures.

While the particular advantage of triangular arrangements of structural components of tubular cross section, especially as regards their tension, compression and shear strength is well known; failure to fully utilize them has resulted from the lack of a satisfactory load-transmitting coupling.

An object of the present invention is to provide an easily assembled and readily disconnected coupling of simple and low cost design, capable of assuming an infinite variety of forms to meet a wide range of structural engineering needs.

A further object of the invention is to provide a rod coupling in which the rod ends and connectors are of complementary interlocking form, with any desired number of rods radiating from the connectors at angles defined by the connectors and diverging angularly in another plane according to the cut of the adjoining end of the rod.

A further object of the invention is to provide a rod coupling for trusses and like structures wherein a multiple of connectors can be united as a single hub with rods radiating in planes at a different angle from each of the respective connectors.

A further object of the invention is to provide a knockdown type structure consisting of rods and connectors that may be assembled in the field by unskilled labour, using no other tools than a mallet and wrench.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

The preferred embodiment of the invention, for purposes of illustration, includes hollow cylindrical tubes of aluminum or other suitable metal whose ends can be cut and embossed in a single operation to provide the desired flared locking tenon. Such tubular members are hereinafter referred to as "rods," under which term are to be included any suitable and comparable components as tubes, struts, and other elongated and preferably, though not necessarily, cylindrical members. A hub-like member, with radially disposed keyway mortise slots that are elongated parallel with the hub axis and open at both ends into which the locking tenon ends of the rods are insertable, serves as the connector for any desired number and arrangement of divergent rods. An axial bolt with end washers and cooperating nut is used to retain the rods against displacement and may also act to couple two or more hubs in axially alignment.

An extended aluminum hub 1 has been found acceptable which is of generally cylindrical form. It has an axial bore 2 and six circumferentially spaced, radially disposed sockets 3 formed as deep grooves running the full length of the hub. These longitudinally extending grooves or sockets 3 have ridges and troughs 4 on opposite side walls that parallel the hub's axis and appear as narrow head keyways when seen from the end of the hub. Obviously, any desired number and spacing of the socket grooves may be provided in the hub's periphery and may be at an angle to the radii.

Figure 3:
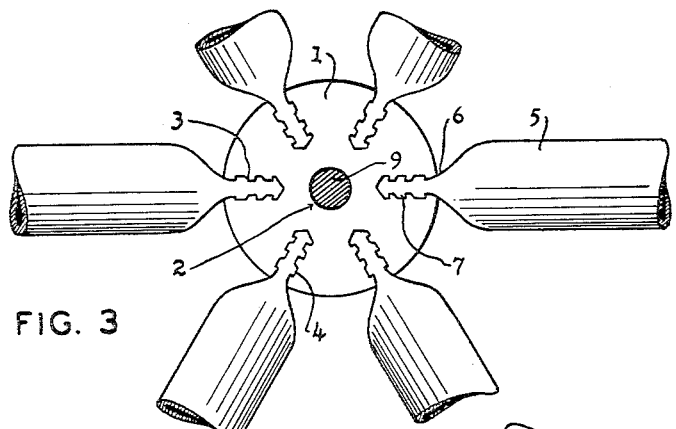
Figure 3 is a similarly enlarged horizontal section, as taken on line 3—3 of Figure 1.
Figure 5:
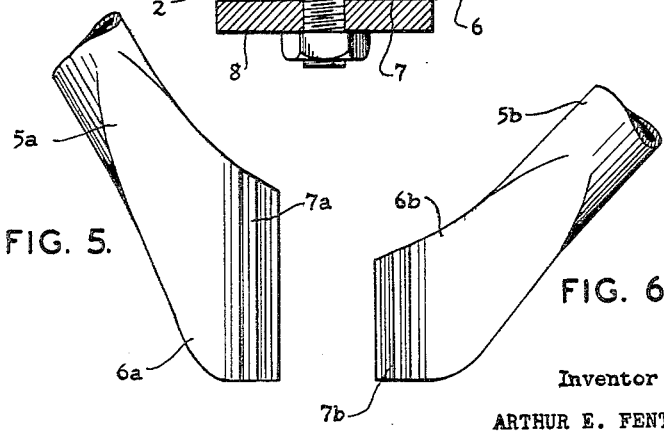
Figures 5 and 6 are elevational details of the flattened, tenon ends of rods with the keys at 30° and 45° respectively.
Figure 6:
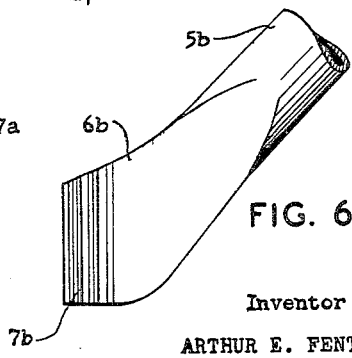

The rods used are hollow aluminum tubes 5, the ends 6 of which are flattened and provided on opposite sides with transversely disposed grooves and ridges 7 to correspond with the width and contour of the socket grooves 3 in the hub into which they are laterally inserted edgewise, as seen clearly in Figure 3. On referring to Figure 3 of the drawings it will be seen that the lateral walls or faces of the flattened ends of the tubes 5 are substantially parallel, and by reference to Figure 4 it will be further observed that these lateral faces are substantially rectangular. As a result the ends 6 of the tubes 5 are of substantially uniform and rectangular shape in plan or transverse section throughout the length of the flattened portion of the tube, and the ends 6 are likewise of substantially uniform and similar rectangular shape in longitudinal section throughout the width of the flattened portion of the flattened end which engages the parallel socket grooves 3. In Figures 5 and 6 the flattened portions 6a and 6b of the offset ends of the tubes 5a and 5b are also formed with more or less substantially rectangular lateral walls or faces. In each case the thickness of the flattened portion of the tubes is for all practical purposes uniform throughout. Where the small groove and ridge keys 7 run directly across the rod ends, the rods normally radiate in the same plane as the hub, however by disposing the groove and ridge keys at an angle of 60° or 45° to the transverse line, the rods will diverge at 60° or 45° from the plane of the hub. In Figures 5 and 6 rods 5a and 5b have their flattened ends 6a and 6b finished with the keys 7a and 7b running at such angles of 60° and 45° respectively. Irrespective of the angle of the keys on the ends of the rods, they slide the same into the hub sockets, with the arrangement of the hub sockets determining the direction in which the rods radiate in the plane of the hub and the angle at which the rod ends are keyed determining the angle at which the radial rods diverge from the plane of the hub.

Figure 1:
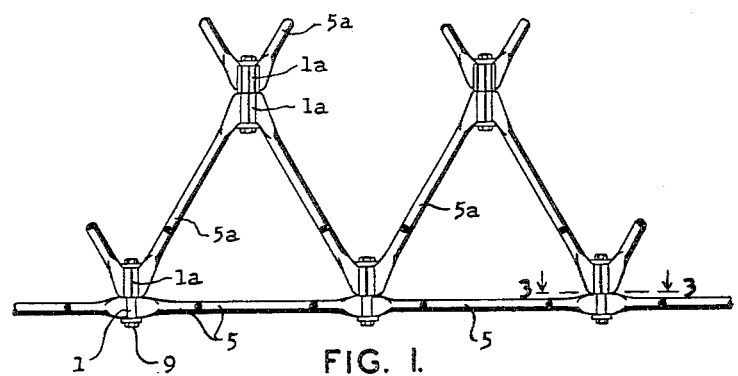
Figure 1 is an elevation of a portion of a truss of polyhedron form embodying this invention.
Figure 2:
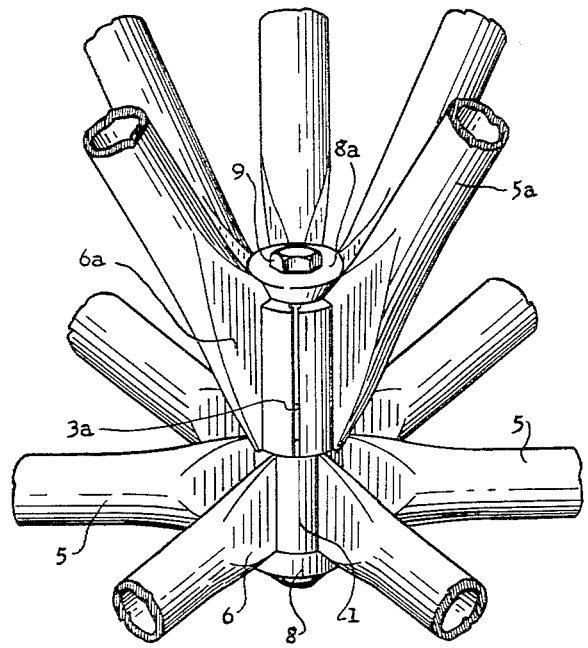
Figure 2 is an enlarged perspective view of a two-hub connector with radiating rods.
Figure 4:
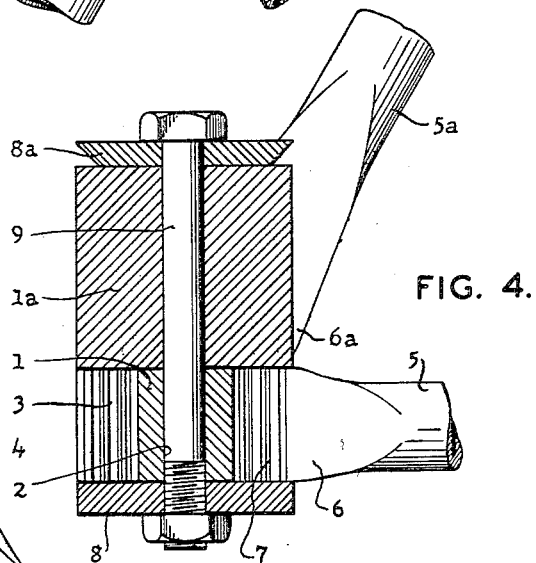
Figure 4 is a vertical transverse section through a coupling, with some of the rods removed.

In Figures 1, 2 and 4, a compound coupling arrangement is shown wherein two hubs 1 and 1a are axially aligned, each having six equally spaced, radially disposed rod sockets 3 and 3a respectively, though the upper hub 1a is rotated 30° relative to the lower to stagger their respective sockets. Rods 5 radiate from the lower hub 1 in the same plane as the hub whereas rods 5a radiating from the upper hub 1a, having their end keys disposed at an angle, are inclined upwards at 60° and as the rod ends 6a are cut at an angle, the hub 1a is of greater length to accommodate them.

The rods 5 are retained in the hub sockets 3 by end plates such as the washer 8, or in the case of an angularly inclined rod 5a by a tapered washer 8a secured to the open end of the hub by an axial pin or fastener such as the nut and bolt assembly 9 extended through the axial bore 2 in the hub and which bolt also serves in a compound coupling to connect the two hubs as well as secure the rod-retaining washers on opposite ends.

While the key parts on the rod ends have been referred to as keys and those on the walls of the socket grooves as keyways, it is obvious these may be reversed since any interlocking form of tenon and mortise where the rod end is presented laterally and inserted from the end of the hub so that the rod is held against longitudinal movement may satisfy and such complementary interlocking structures are regarded as cooperating key parts.

As the components herein described can be manufactured cheaply from stock forms, and the elements being inter-changeable and disconnectible, it will be apparent that a truss construction suitable for rapid assembly in the field is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A truss including a pair of similar connector hubs comprising a first hub and a second hub arranged in axial alignment, each hub having similar longitudinally extending parallel keyways therethrough, said keyways opening to both ends of each hub for insertion of keys therewithin and being equidistantly spaced around the periphery of each hub, said first and second hubs being rotatably disposed with respect to each other about a common axis for positioning of the keyways of each hub, a first set of rods, each rod of said first set having a flattened end provided with a locking key disposed transversely to the longitudinal axis of the rod, said locking key connecting with a keyway in said first hub, each of said rods of said first set extending from said first hub in a radial manner with the longitudinal axis of each rod transverse to the axis of said first hub, a second set of rods, each rod of said second set having flattened ends provided with a locking key disposed transversely to the longitudinal axis of the rod, said last mentioned key connecting with a keyway in said second hub, each of said rods of said second set extending from said second hub in a radial manner with the longitudinal axis of each rod transverse to the axis of said second hub, and locking means securing said first and second hubs together in prearranged relative rotative position about a common axis and against unauthorized relative rotation and securing the keys of each of said sets of rods in keyways of their respective hubs.

2. A truss including a pair of similar connector hubs comprising a first hub and a second hub arranged in axial alignment, each hub having similar longitudinally extending parallel keyways therethrough, said keyways opening to both ends of each hub for insertion of keys therewith and being equidistantly spaced around the periphery of each hub, said first and second hubs being rotatively disposed with respect to each other about a common axis for positioning of the keyways of each hub, a first set of rods, each rod of said first set having a flattened end provided with a transverse locking key disposed normal to the longitudinal axis of the rod, said key connecting with a keyway in said first hub, each of said rods of said first set extending from said first hub in a radial manner with the longitudinal axis of each rod normal to the axis of said first hub, a second set of rods, each rod of said second set having a flattened end provided with a transverse locking key angularly disposed at an acute angle with respect to the longitudinal axis of the rod, said last mentioned key connecting with a keyway in said second hub, each of said rods of said second set extending from said second hub in a radial manner with the longitudinal axis of each rod at an acute angle with respect to the axis of said second hub, said second set of rods extending divergently from said first set of rods in a pyramidal arrangement, and locking means securing said first and second hubs together against unauthorized relative rotation and in prearranged relative rotative position about a common axis and securing the keys of each of said sets of rods in keyways of their respective hubs.

3. A truss as specified in claim 2 wherein said pair of similar connector hubs are in axial abutting alignment, with the keyways of one of the hubs rotatively disposed out of alignment with the keyways of the other of the hubs, the abutment of said hubs with each other securing the keys of each of said sets of rods within said keyways of each of said hubs at one end thereof, and said locking means maintaining said hubs in axial abutting alignment and locking the keys of each of said sets of rods within each of said hubs at the other end thereof.

4. A truss including a pair of similar connector hubs comprising a first hub and a second hub arranged in axial alignment, each hub having similar longitudinally extending parallel keyways therethrough, said keyways opening to both ends of each hub for insertion of keys therewithin and being equidistantly spaced around the periphery of each hub, said first and second hubs being rotatively disposed with respect to each other about a common axis for positioning of the keyways of each hub, a first set of rods, each rod of said first set having a flattened end provided with a transverse locking key angularly disposed at an acute angle with respect to the longitudinal axis of the rod, said key connecting with a keyway in said first hub, each of said rods of said first set extending from said first hub in a radial manner with the longitudinal axis of each rod at an acute angle with respect to the axis of said first hub, a second set of rods, each rod of said second set having a flattened end provided with a transverse locking key angularly disposed at an acute angle with respect to the longitudinal axis of the rod, said last mentioned key connecting with a keyway in said second hub, each of said rods of said second set extending from said second hub in a radial manner with the longitudinal axis of each rod at an acute angle with respect to the axis of said second hub, said first and second sets of rods extending divergently from each other at an obtuse angle, and locking means securing said first and second hubs together against unauthorized relative rotation and in prearranged relative rotative positions about a common axis and securing the keys of each of said sets of rods in keyways of their respective hubs.

5. A truss as specified in claim 4 wherein each of said hubs are arranged in abutting axial alignment with the keyways thereof aligned, so that the keys of said first set of rods are disposed within one of said hubs in abutment with the keys of said second set of rods disposed in the other of said hubs, permitting insertion of the keys of either of said sets of rods through the keyways of either of the hubs, and said locking means abuts the opposite ends of the hubs and keys from said hub to hub and key to key abutment and secures said hubs and keys in abutment and secures said keys within said keyways.

References Cited in the file of this patent

UNITED STATES PATENTS 563,529    Wilson _____ July 7, 1896

(Other references on following page)

UNITED STATES PATENTS

| | | |
|---|---|---|
| 1,026,845 | Bishop | May 21, 1912 |
| 1,070,165 | Newlin | Aug. 12, 1913 |
| 1,444,491 | Baldwin | Feb. 6, 1923 |
| 1,793,468 | Densmore | Feb. 24, 1931 |
| 1,946,408 | Loudy | Feb. 6, 1934 |

FOREIGN PATENTS

| | | |
|---|---|---|
| 24,087 | Great Britain | 1914 |
| 682,854 | France | Feb. 18, 1930 |
| 673,610 | Great Britain | June 11, 1952 |